(12) United States Patent
Kogan

(10) Patent No.: US 8,499,099 B1
(45) Date of Patent: Jul. 30, 2013

(54) CONVERTING DATA INTO ADDRESSES

(75) Inventor: David Kogan, Natick, MA (US)

(73) Assignee: Google Inc., Mountain View, CA (US)

(*) Notice: Subject to any disclaimer, the term of this patent is extended or adjusted under 35 U.S.C. 154(b) by 134 days.

(21) Appl. No.: 13/075,066

(22) Filed: Mar. 29, 2011

(51) Int. Cl.
*G06F 15/16* (2006.01)

(52) U.S. Cl.
USPC ............................. 709/245; 709/247

(58) Field of Classification Search
USPC .................................. 709/245, 247
See application file for complete search history.

(56) References Cited

U.S. PATENT DOCUMENTS 7,430,561 B2 * 9/2008 Bailey et al. .......................... 1/1
2009/0049026 A1 * 2/2009 Ohguro .............................. 707/4

* cited by examiner

*Primary Examiner* — Adnan Mirza
(74) *Attorney, Agent, or Firm* — Morris & Kamlay LLP

(57) ABSTRACT

According to one aspect of the present disclosure, a system for converting data into a shortened Uniform Resource Locator (URL) address is described. The system includes a memory for storing instructions to convert data, and a processor. The processor is configured to execute the instructions to receive the data, convert the data into a first sequence of symbols, and divide the first sequence of symbols into second sequences of symbols. The processor is also configured to execute the instructions to include, in each of a plurality of first addresses, a respective one of the second sequences of symbols, and associate each of the first addresses with a corresponding shortened address. The processor is further configured to execute the instructions to combine a portion of each shortened address into an index address, and associate the index address with a shortened index address. Methods and machine-readable storage media are also described.

38 Claims, 9 Drawing Sheets

← http://sssty.com/... — 416
← http://body.com/load#dGlvbgAAAAABAAEgAAAAAQAEgAAAAABAAEASAAAAAEAAThCSU0ERhGWCBHbG9iYWwgTGlnaHRRpbmcg — 418
← http://body.com/load#OW5nbGUAAAAABAAAAHg4OkINBBkSRIggR2xvYmFsIEFsdGlodWRIAAAAAAQAAAAeOEJJ — 420 http://body.com/load#v/USSSVPq3/J1/wDV7/FcMrkkkkkkkkkkkkkkkkkkkv/2Q== ← 422

FIG. 4D

← http://goo.gl/3987etuo — 424
← http://goo.gl/3409985eo — 426
← http://goo.gl/rgoeusnh — 428 http://goo.gl/ouue9333 ← 430

FIG. 4E http://body.com/loadmany/#3987etuo,3409985eo,rgoeusnh,...,ouue9333 ← 432

FIG. 4F http://goo.gl/ouue9333 ← 434

FIG. 4G

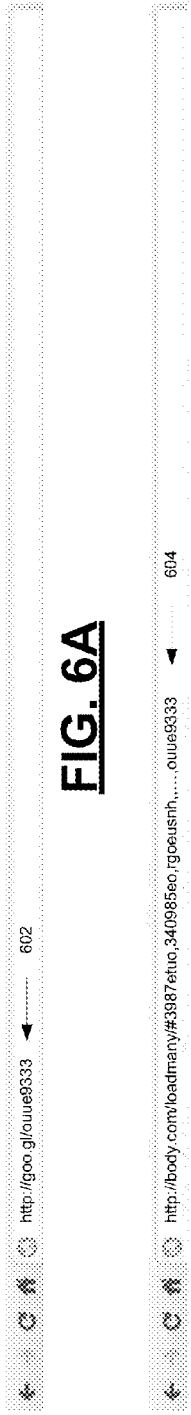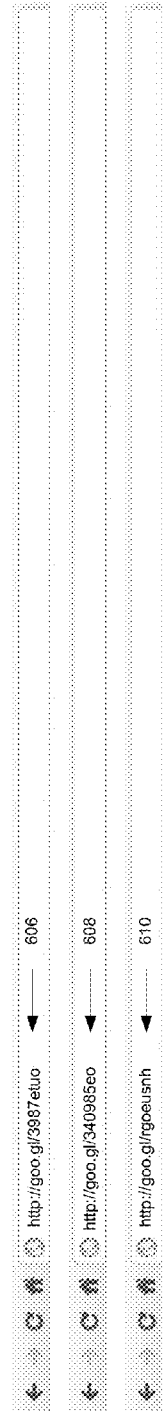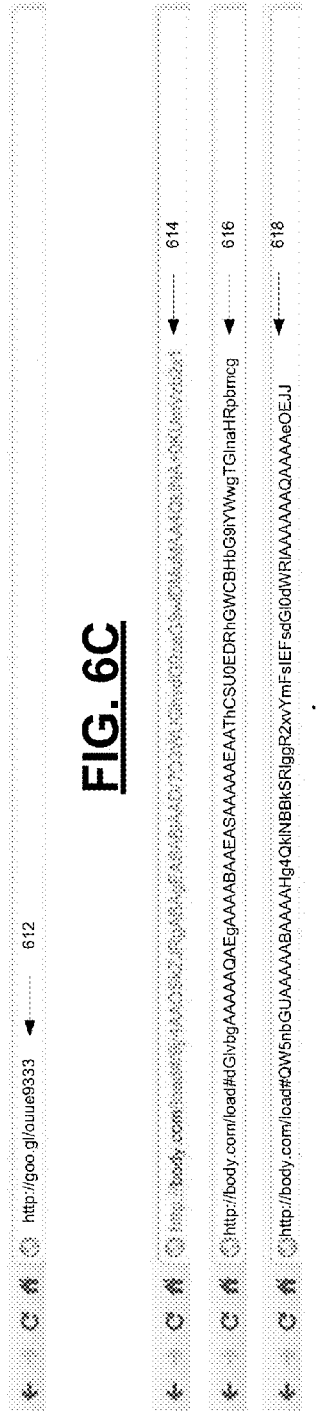
FIG. 6A
FIG. 6B
FIG. 6C
FIG. 6D

622 → /9j/4AAQSkZJRgABAgEASABIAAD/7Q3WUGhvdG9zaG9wIDMuMAA4QklNA+0KUmVzb2x1
624 → dGlvbgAAAAAQAEgAAAABAAEASAAAAAEAAThCSU0EDRhGWCBHbG9iYWwgTGlnaHRpbmcg
626 → QW5nbGUAAAAABAAAAHg4QklNBBkSR1ggR2xvYmFsIEFsdGl0dWRlAAAAAQAAAAeOEJJ

. . .

628 → VUSSSVPq3/J1/wDV7/FcMkkkkkkkkkkkkkkkkkkkkkkkkv/2Q==

FIG. 6E

630 →
```
/9j/4AAQSkZJRgABAgEASABIAAD/7Q3WUGhvdG9zaG9wIDMuMAA4QklNA+0KUmVzb2x1
dGlvbgAAAAAQAEgAAAABAAEASAAAAAEAAThCSU0EDRhGWCBHbG9iYWwgTGlnaHRpbmcg
QW5nbGUAAAAABAAAAHg4QklNBBkSR1ggR2xvYmFsIEFsdGl0dWRlAAAAAQAAAAeOEJJ
                                   .
                                   .
                                   .
VUSSSVPq3/J1/wDV7/FcMkkkkkkkkkkkkkkkkkkkkkkkkv/2Q==
```

FIG. 6F

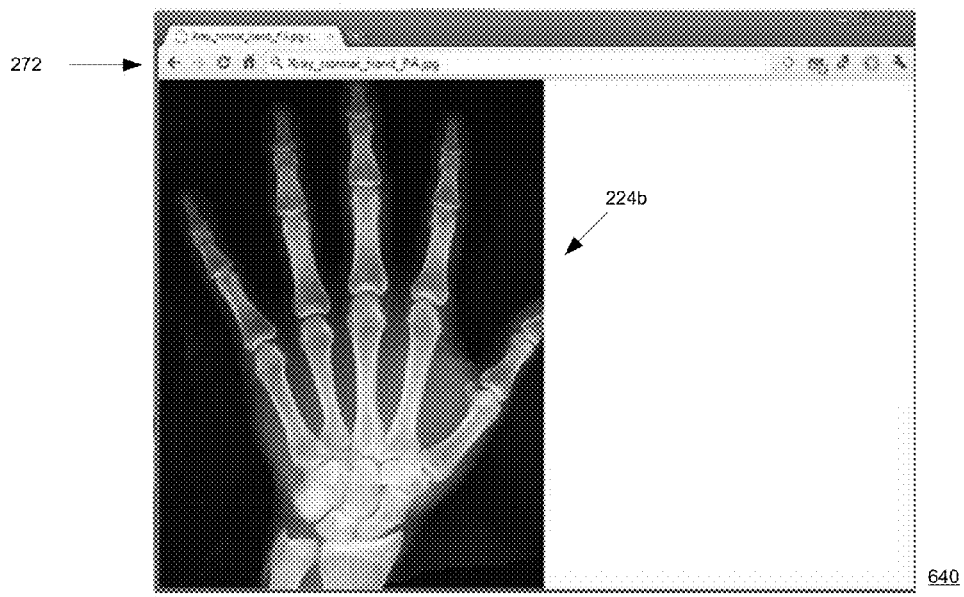

FIG. 6G

CONVERTING DATA INTO ADDRESSES

BACKGROUND

1. Field

The present disclosure generally relates to the transmission of data.

2. Description of the Related Art

A user who wants to share data from a client-side Internet application like a web browser with another user over the Internet usually has to store that data first on a server. Storing data to the server usually requires that the user first have access to the server, which requires user authentication and increases loading time by the client-side Internet application. Furthermore, the user must then spend time uploading the data to the server, which takes time and occupies storage space on the server. Accordingly, client-side data sharing amongst users usually cannot occur without providing a server with adequate storage and performance capabilities, and taking user time to register with the server and upload the data to be shared.

SUMMARY

According to one aspect of the present disclosure, a system for converting data into a shortened Uniform Resource Locator (URL) address is disclosed. The system includes a memory for storing instructions to convert data, and a processor. The processor is configured to execute the instructions to receive the data to be transmitted, convert the data into a first sequence of symbols, and divide the first sequence of symbols into a plurality of second sequences of symbols. The processor is also configured to execute the instructions to include, in each of a plurality of first addresses, a respective one of the plurality of second sequences of symbols, and associate each of the plurality of first addresses with a corresponding shortened address. The processor is further configured to execute the instructions to combine a portion of each of the shortened addresses into an index address, and associate the index address with a shortened index address.

According to another aspect of the present disclosure, a method for converting data into a shortened URL address is disclosed. The method includes receiving data to be transmitted, converting the data into a first sequence of symbols, dividing the first sequence of symbols into a plurality of second sequences of symbols, and including, in each of a plurality of first addresses, a respective one of the plurality of second sequences of symbols. The method also includes associating each of the plurality of first addresses with a corresponding shortened address, combining a portion of each of the shortened addresses into an index address, and associating the index address with a shortened index address.

According to a further aspect of the present disclosure, a machine-readable storage medium comprising machine-readable instructions for causing a processor to execute a method for converting data into a shortened URL address is disclosed. The method includes receiving data to be transmitted, converting the data into a first sequence of symbols, dividing the first sequence of symbols into a plurality of second sequences of symbols, and including, in each of a plurality of first addresses, a respective one of the plurality of second sequences of symbols. The method also includes associating each of the plurality of first addresses with a corresponding shortened address, combining a portion of each of the shortened addresses into an index address, and associating the index address with a shortened index address.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A-4G are exemplary illustrations associated with the exemplary process of FIG. 3.

FIGS. 6A-6G are exemplary illustrations associated with the exemplary process of FIG. 5.

DETAILED DESCRIPTION

Figure 1:
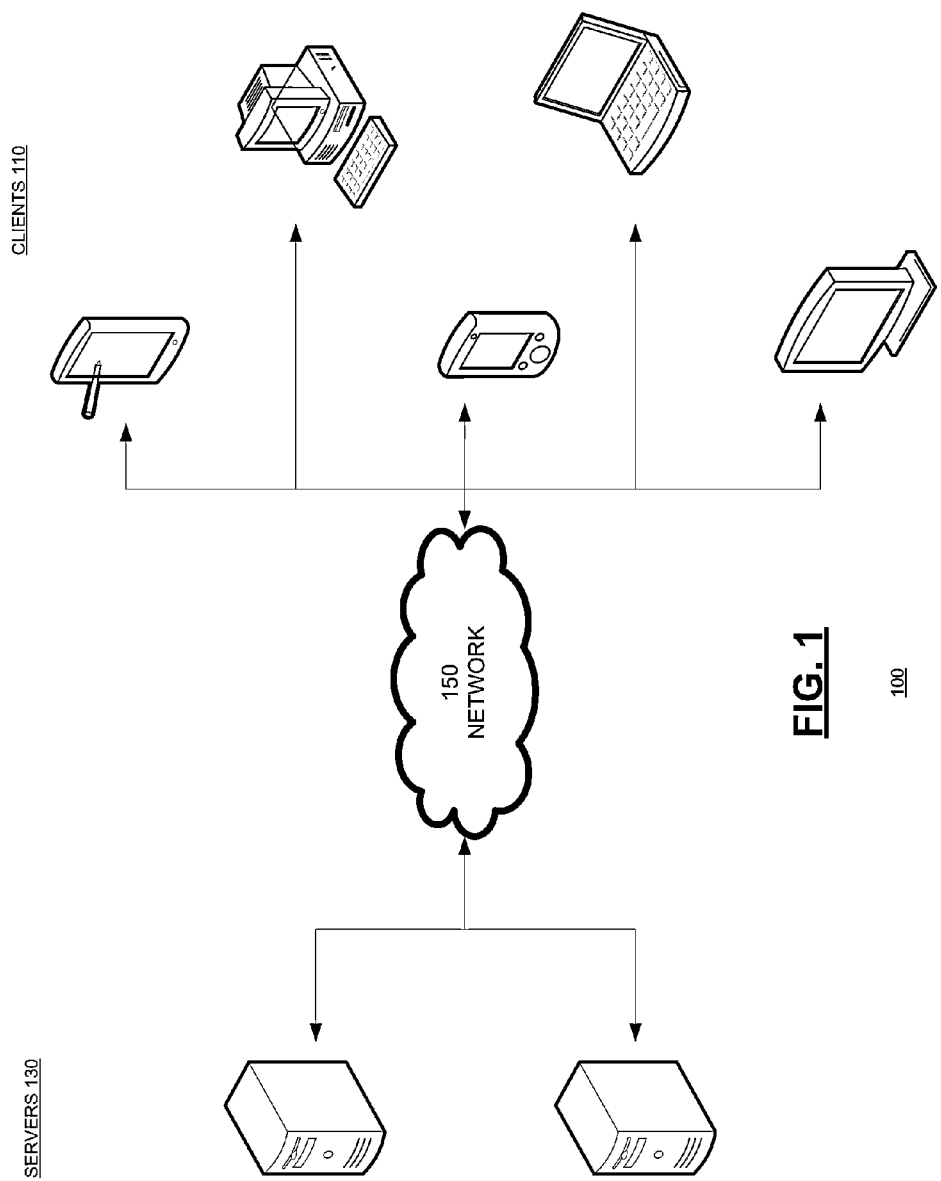
FIG. 1 illustrates an exemplary architecture for converting data into, and retrieving data from, a shortened Uniform Resource Locator (URL) address.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system stores data to be shared, such as an image, within one or many addresses, such as Uniform Resource Locators (URLs), thereby avoiding the need to for the user to connect to a server to store the data on the server. The data, which is stored locally on a client, such as a desktop computer, mobile computer, or tablet, is converted by the client into a shortened URL index address. For example, image data greater than a certain size (e.g., 2000 characters) is first converted into a string (e.g., a sequence of symbols), and that string is divided into substrings. Each substring is included in a non-shortened URL. Each non-shortened URL is then shortened using a URL shortening service (e.g., http://goo.gl, http://bit.ly, and http://tinyurl.com). The plurality of shortened URLs is combined into a single URL (the "index URL") from which each of the plurality of shortened URLs can be retrieved. Finally, the index URL is shortened into a shortened index URL using the URL shortening service. The disclosed system can be executed by software that makes the process invisible to the first user, such that the first user is provided with the shortened index URL after providing the data to be shared.

In order for a second user to load the data to be shared by the first user, the first user sends the shortened index URL to the second user, and the second user enters the shortened index URL into a web browser such as by clicking on the shortened index URL as a hyperlink. The shortened index URL, when entered, redirects (e.g., via an HTTP redirect) to the index URL. The index URL loads an index page that is configured (e.g., using JavaScript) to load the plurality of shortened URLs into respective invisible HTML frames, iframes, within the web browser. Each shortened URL redirects, within its corresponding iframe, to the corresponding non-shortened URL. The web page loaded by the non-shortened URL in the iframe is configured to provide the corresponding substring from the non-shortened URL to the index page. The index page obtains the substrings from each iframe, and combines the substrings to create the string. The substrings can be obtained and/or combined by the index page according to various data structures, such as a list, tree, array, or graph. The string is then converted by the web browser into the image data for display to the user in the web browser.

Although the examples discussed herein refer to URL addresses, the disclosed systems, methods, and machine-readable storage media can be applied to any addresses that can include an appended sequence of symbols, such as File Transfer Protocol (FTP) addresses, or any addresses compatible with URL shortener services. Similarly, although the examples discussed herein refer to image data transmitted through a web browser, the disclosed systems, methods, and machine-readable storage media can be applied to any form of data transmitted through any means. For example, a first user of the disclosed system can share a user state (e.g., a current view state of a 3D object) with a second user using an HTTP client such as the web browser.

FIG. 1 illustrates an exemplary architecture 100 for converting data into and retrieving data from a shortened URL address. The architecture 100 includes servers 130 and clients 110 connected over a network 150.

One of the many servers 130 is configured to host a data encoder service. For purposes of load balancing, multiple servers 130 can host the data encoder service together. As discussed herein, the data encoder service is configured to be copied onto one of the clients 110 (e.g., as a web page running in a web browser), and once on the client 110, receive data to be shared from a user of the client 110. The data encoder service converts the data into one or many addresses, and then returns to the user a shortened index address (e.g., URLs) that points to the one or many addresses in order to access the data. The user can then provide the shortened address (e.g., URL) to another user of another one of the many clients 110 in order for that other user to access the data without the need to log in to a server to retrieve the data. As such, the disclosed service can, for example, create a virtual disk space by using shortened addresses of about 10-20 characters as keys or pointers to longer addresses of around 2000 characters. As a result, the longer addresses, which include pieces of the data, can, for example, be treated as disk space upon which a file system of arbitrary design can be built.

The servers 130 can be any device having an appropriate processor, memory, and communications capability for hosting data encoder service. The clients 110 to which the servers 130 are connected over the network 150 can be, for example, desktop computers, mobile computers, tablet computers, mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
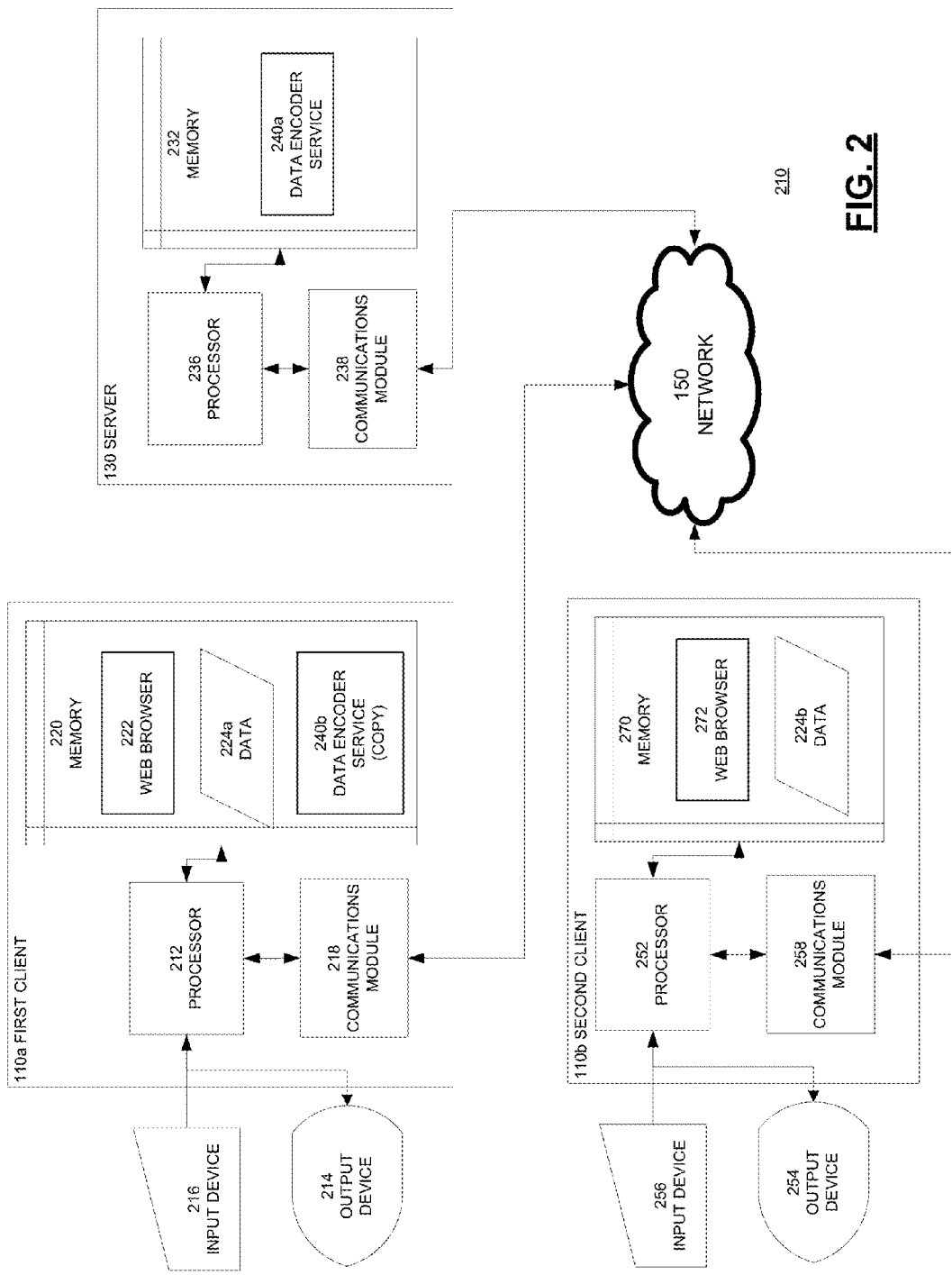
FIG. 2 is a block diagram illustrating the exemplary clients and server from the architecture of FIG. 1 according to certain aspects of the disclosure.

FIG. 2 is a block diagram illustrating an exemplary server 130 and clients 110a and 110b in the architecture 100 of FIG. 1 according to certain aspects of the disclosure. The first client 110a, second client 110b, and the server 130 are connected over the network 150 via respective communications modules 218, 258, and 238. The communications modules 218, 258, and 238 are configured to interface with the network 150 to send and receive information, such as data, requests, responses, and commands to other devices on the network. The communications modules 218, 258, and 238 can be, for example, modems or Ethernet cards.

The server 130 includes a processor 236, a communications module 238, and a memory 232 that includes a data encoder service 240. The processor 236 of the server 130 is configured to execute instructions, such as instructions physically coded into the processor 236, instructions received from software in memory 240, or a combination of both. For example, the processor 236 of the server 130 executes instructions to provide a copy of the data encoder service 240a to the first client 110a in response to a request for the copy of the data encoder service 240a received from, for example, a web browser 222 in the memory 220 of the first client 110a. In such cases, the data encoder service 240a can be a web page or application configured to run in the web browser 222.

The first client 110a includes a processor 212, the communications module 218, and the memory 220 that includes the web browser 222, data 224 to be shared with the second client 110b, and a copy of the data encoder service 240b. The first client 110a also includes an input device 216, such as a keyboard or mouse, and an output device 214, such as a display. The processor 212 of the first client 110a is configured to execute instructions, such as instructions physically coded into the processor 212, instructions received from software in memory 240, or a combination of both. For example, the processor 212 of the first client 110a executes instructions to receive the data 224a to be shared/transmitted. The data 224a can be, for example, text data, audio data, image data, video data, presentation/slideshow data, user state data (e.g., a current view in the web browser 222), or any other data that can be stored in the memory 220 of the client. The data 224a can be obtained by a user of the first client 110a providing the data 224a to the data encoder service 240b running in the web browser 222. The data encoder service 240b may alternatively be an inherent part of the web browser 222, in which case the copy of the data encoder service 240b would not need to be received from the server 130, but instead installed as part of the web browser 222. The processor 212 of the first client 110a executes instructions from the data encoder service 240b causing the processor 212 to convert the data 224a into a first sequence of symbols. The first sequence of symbols can be a string of characters. The conversion of the data from binary to character/text format uses an appropriate encoder. Exemplary encoders include, but are not limited to, hexadecimal, Base64, basE91, Ascii85, quoted-printable, uuencoding, yEnc, percent, BOO, BTOA, and USR encoding.

The processor 212 of the first client 110a divides the first sequence of symbols into a plurality of second sequences of symbols. The number of second sequences of symbols is based on dividing the number of symbols in the first sequence by a predetermined numerical symbol limit. For example, if the data encoder service 240b later includes the sequences of symbols in URL addresses, which are often limited in length by web browsers (e.g., to 2000 characters), then the number of symbols in the first sequence can be divided by that limit.

Thus, if the first sequence has 20,000 characters, then it can be divided by 2000 into 10 second sequences of symbols, as long as those 10 sequences also include enough character space for the URL address (e.g., protocol and domain).

The processor 212 of the first client 110a includes, in each of a plurality of first addresses, a respective one of the plurality of second sequences of symbols. The first addresses, which can be URL addresses, can include a respective one of second sequences after a hash tag (e.g., "#"). For example, the second sequence "dGlvbgAAAAAQA" can be included after the URL "http://body.com/load#" to create "http://body.com/load dGlvbgAAAAAQA".

The processor 212 of the first client 110a associates each of the first addresses with a corresponding shortened address. Each of the shortened addresses, which can be URL addresses, can be associated with a corresponding first address using a URL shortening service.

The processor 212 further combines a portion of each of the shortened addresses into an index address, which can be a URL address. For example, the portions "3987" and "3409" from the shortened addresses "http://goo.gl/3987" and "http://goo.gl/3409" can be combined into the index address "http://body.com/loadmany/#3987,3409". If the number of symbols in the combined portion of each of the shortened addresses is greater than a predetermined limit, then the combined portion can be associated (e.g., using a URL shortener) with a corresponding shortened portion that is then combined into the indexed address instead of the combined portion. The combined portion can be associated with a corresponding shortened portion recursively (e.g., using a URL shortener recursively) until a shortened portion of an appropriate length is reached. Because the index address is not limited to being stored on the first client 110a or the second client 110b, it is therefore accessible by the first client 110a and the second client 110b. For example, the index address can be entered into the web browsers 222 and 272 of the first client 110a and the second client 110b by clicking on a hyperlink to the index address.

The processor 212 of the first client 110a also associates the index address with a shortened index address. The shortened address, which can be a URL address, can be associated with the index address using a URL shortener. The shortened address can be provided in the web browser 222 of the first client 110a so that the user of the first client 110a can then provide the shortened address to a user of the second client 110b so that the user of the second client 110b can obtain a copy of the data 224a.

The second client 110b includes a processor 252, the communications module 258, and a memory 270 that includes a web browser 272. The second client 110b also includes an input device 256, such as a keyboard or mouse, and an output device 254, such as a display. The processor 252 of the second client 110b is configured to execute instructions, such as instructions physically coded into the processor 252, instructions received from software in memory 270, or a combination of both. For example, the processor 252 of the second client 110b executes instructions (e.g., from a web page loaded in the web browser 272) causing the processor 252 to obtain the index address from the shortened index address (e.g., discussed above with reference to the configuration of the processor 252 on the server 130). The shortened address can be obtained from the user of the first client 110a so that the user of the second client 110b can enter the shortened URL address into the web browser 272 on the second client 110b using the input device 256. Where the shortened address is a URL address obtained from, or otherwise associated with, a URL shortener, the index address can then be obtained as a result of a HTTP redirect instruction received by the web browser 272.

The processor 252 of the second client 110b converts the index address into the plurality of shortened addresses. The instructions can be received, for example, in JavaScript format from a web page at the index address that is loaded by the web browser 272. The processor 252 of the second client 110b obtains the first address from each of the plurality of shortened addresses. Where the shortened addresses are URL addresses obtained from, or otherwise associated with, a URL shortener, each first address can then be obtained as a result of a HTTP redirect instruction received by the web browser 272 for a corresponding shortened address.

The processor 252 of the second client 110b retrieves the first sequence of symbols from each of the first addresses, and combine each of the first sequences of symbols into the second sequence of symbols. Where the first addresses are URL addresses, each web page associated with the first address can be loaded in a frame in the web browser 272, with the frames in one web page or across multiple web pages. The frame can be, for example, an iframe that is otherwise invisible to the user of the second client 110b. The web browser, upon receiving instructions from at least one of the web pages in a client-side scripting language such as Javascript, then retrieves the first sequence of symbols from each corresponding frame, and combines each of the first sequences of symbols into the second sequence of symbols. Each frame can be "destroyed" or otherwise removed from the web page(s) after its corresponding first sequence of symbols is received. In addition to containing sequences of symbols, each frame can contain a pointer to (e.g., an address of) another frame. In certain instances, the pointer cannot be a circular reference because a pointer to a given frame can be provided once a shortened address is generated for the given frame, after which point the shortened address generally remains constant.

Script tags can be used in addition to, or to replace, frames for loading the first addresses. Additionally, requests using the Ajax web development method (e.g., Ajax requests) can be used to retrieve the first sequence of symbols from each of the first addresses, and then combine each of the first sequences of symbols into the second sequence of symbols without interfering with the display and behavior of a current web page in the web browser 272.

The first sequences can be obtained and combined into the second sequence of symbols in sequence or in parallel according to various data structures, such as a list, tree, array, or graph. The data structure can be selected, for example, based on the type of data 224a to be shared. If the data 224a is to be retrieved at once, then a linked list or a tree data structure can be used. A linked list can be suitable if the size of the data 224a is relatively small. For example, if the URL limit is 2000 characters, and the data 224a is a text file that is 4500 characters long, a first frame in the web browser 272 can include 1500 of the 4500 characters and a shortened URL address for a second frame. The second frame can include another 1500 of the 4500 characters and a shortened URL address for a third frame. The third frame can include the remaining 1500 characters. The three frames could be generated in the web browser 272 in reverse order (e.g., the third frame, then the second frame, then the first frame).

A linked list can also be suitable if the data 224a does not need to be retrieved at once. For example, if the data 224a were a text file that a user may not entirely read, then portions (e.g., respective frames) of the data 224a could be retrieved at intervals as the user reads through the text of the data 224a.

The data structures can also be trees of different depths. For example, if the URL limit is 2000 characters, and a shortened URL address is 20 characters long, then 2000 bytes (e.g., characters) of data can be stored in a one-level hierarchy (e.g., a hierarchy having no index, but instead one data page). Similarly, 200 kilobytes of data can be stored in a two-level hierarchy (e.g., where one index page holds pointers to 100 pages storing 2000 bytes each), and 20 megabytes of data can be stored in a three-level hierarchy (e.g., where one index page holds pointers to 100 index pages, each of which holds pointers to 100 pages storing 2000 bytes each). For example, a one-level tree can be used for a small amount of text data 224a, a two-level tree can be used for data 224a for a small image, a three-level tree can be used for data 224a for a small video, a four-level tree can be used for data 224a for a movie, etc. In this circumstance, each additional level in the tree data structure multiplies storage space by a factor of 100.

In addition to specific data structures, such as linked lists and trees, a more generalized structure such as a Directed Acyclical Graph (DAG) can be used when random access to portions of the data 224a is desired. For example, if the data 224a is an encyclopedia, and the entire contents of the encyclopedia do not need to be retrieved, then a portion of the encyclopedia (e.g., a portion of the data 224a) can be retrieved using a DAG data structure.

The processor 252 of the second client 110b converts the second sequence of symbols into data 224b to be provided to a user. The conversion can occur using a binary to character/text decoder, such as, without limitation, hexadecimal, Base64, basE91, Ascii85, quoted-printable, uudecoding, yDec, percent, BOO, BTOA, and USR decoders. The binary to character/text decoder can be part of the web browser 272. The processor 252 of the second client 110b is executes instructions causing the processor 252 to provide the data 224b to the user of the second client 110b, such as within the web browser 272.

Figure 3:
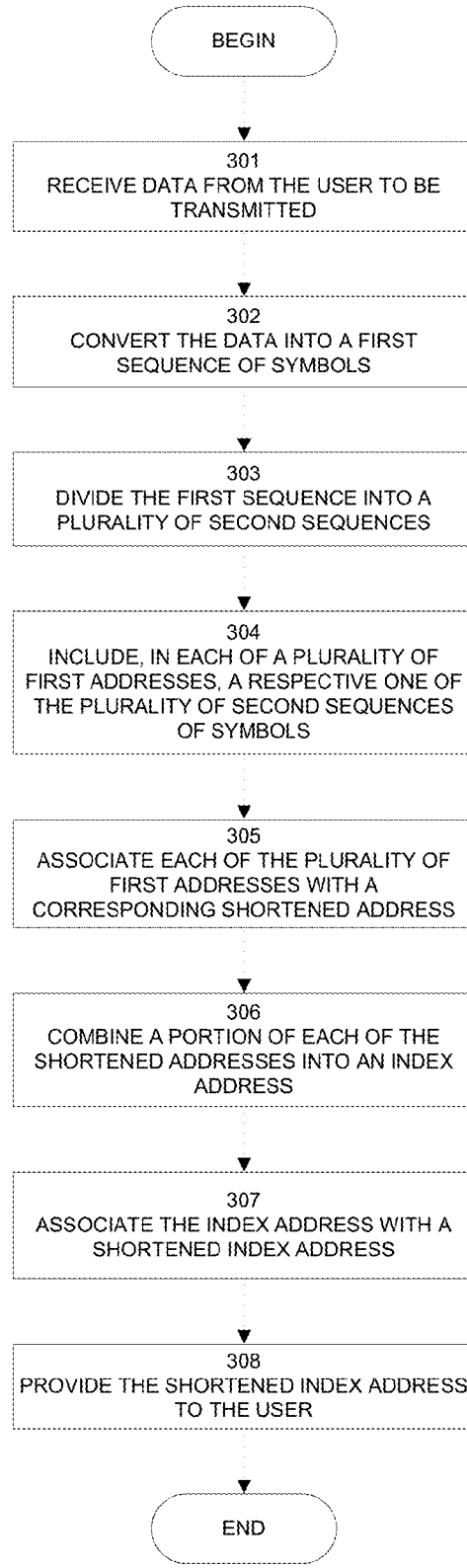
FIG. 3 illustrates an exemplary process for converting data into a shortened URL index address using an exemplary client of FIG. 2.

FIG. 3 illustrates an exemplary process 300 for converting data 224a into a shortened URL address using the exemplary first client 110a of FIG. 2. The process 300 begins by proceeding to step 301, in which the data encoder service 240b on the first client 110a receives data 224a to be shared with the user of the second client 110b. In step 302, the data 224a is converted by the data encoder service 240b into a first sequence of symbols, and in step 303 the first sequence of symbols is divided by the data encoder service 240b into a plurality of second sequences of symbols.

In step 304, a respective one of the plurality of second sequences of symbols is included each of a plurality of first addresses by the data encoder service 240b, and in step 305, each of the plurality of first addresses is associated by the data encoder service 240b (e.g., with reference to a URL shortener) with a corresponding shortened address. In step 306, the data encoder service 240b combines a portion of each of the shortened addresses into an index address, and, in step 307, the data encoder service 240b associates the index address with a shortened index address. In step 308, the data encoder service 240b provides the shortened index address to the user, and the process 300 ends.

Figures 4A, 4B, 4C:
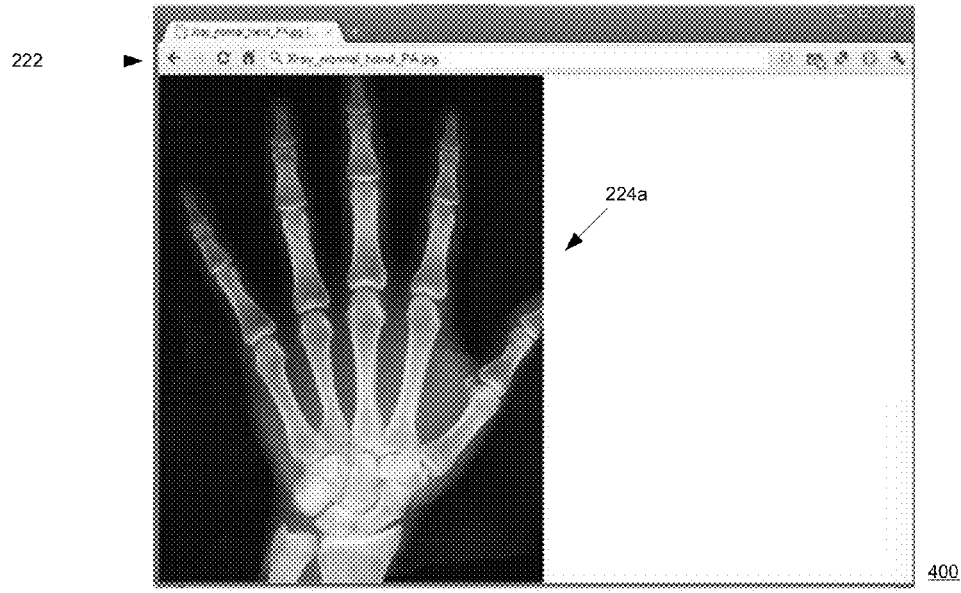

FIG. 3 set forth an exemplary process 300 for converting data 224a into a shortened URL address using the exemplary first client 110a and server 130 of FIG. 2. An example will now be described using the exemplary process 300 of FIG. 3, image data 224a, and addresses that are URL addresses. The process 300 begins by proceeding to step 301, in which the first client 110a uses the input device 216 and web browser 222 to provide image data 224a for an x-ray to the data encoder service 240b on the first client 110a to share with the user of the second client 110b. An exemplary screenshot 400 of the web browser 222 displaying the image data 224a on the output device 214 is shown in FIG. 4A.

In step 303, the data encoder service 240b converts the data 224a into a first sequence of symbols 406 using a Base64 data encoder. The first sequence of symbols 406 is shown in FIG. 4B. In step 303, the first sequence of symbols 406 is divided into by the data encoder service 240b into n second sequences 408, 410, 412, and 414 of symbols of no more than 70 characters. The first three and last second sequences of symbols 408, 410, 412, and 414 are shown in FIG. 4C. In step 304, a respective one of the plurality of second sequences of symbols 408, 410, 412, and 414 is included by the data encoder service 240b in each of a plurality of n first addresses 416, 418, 420, and 422 as illustrated in FIG. 4D. Specifically, a respective one of the n second sequences of symbols 408, 410, 412, and 414 is appended by the data encoder service 240b to the URL "http://body.com/load#" to create the n first addresses 416, 418, 420, and 422.

In step 305, each of the n first addresses 416, 418, 420, and 422 is associated by the data encoder service 240b using a URL shortener with a corresponding shortened URL address 424, 426, 428, and 430, as illustrated in FIG. 4E. This process reduces the length of the addresses from about 90 characters in the first addresses 416, 418, 420, and 422 to about 25 characters in each of the shortened addresses 424, 426, 428, and 430. If longer second sequences of symbols 408, 410, 412, and 414 were used, then the reduction in character length would be even greater.

In step 306, the data encoder service 240b combines the last portion of each of the n shortened addresses 424, 426, 428, and 430 into an index address 432. As illustrated in FIG. 4F, the last eight characters of each of the shortened addresses 424, 426, 428, and 430 are combined together, with separation by commas, and appended to the address "http://body.com/loadmany/#" to create the index address 432. A directory or web page referred to in the index address 432, in this case "loadmany," can include instructions in a client-side scripting language (e.g., Javascript) in order to later divide the index address 432 into the shortened addresses 424, 426, 428, and 430, as discussed above.

In step 307, the data encoder service 240b associates the index address 432 with a shortened index address 434. In the example illustrated in FIG. 4G, the last portion, "ouue9333," of the index address 432 is appended to the URL address "http://goo.gl/" to create the shortened index address 434. In step 308, the data encoder service 240b provides the shortened index address "http://goo.gl/ouue9333" to the user, and the process 300 ends.

Having illustrated an exemplary process 300 for converting data 224a into a shortened URL address in FIG. 3, and related illustrations in FIGS. 4A-4G, FIG. 5 illustrates an exemplary process 500 for retrieving the data 224b from the shortened URL address using the exemplary second client 110b of FIG. 2. The process 500 begins by proceeding to step 501, in which a shortened index address is obtained from the first client 110a, and in step 502 an index address is obtained from the shortened index address. In step 503 the index address is converted into a plurality of shortened addresses, and in step 504 a first address is obtained from each of the plurality of shortened addresses. In step 505, a first sequence of symbols is retrieved from each of the first addresses. In step 506, each of the first sequences of symbols is combined into a second sequence of symbols, and in step 507 the second sequence of symbols is converted into data to be provided to a user. In step 508, the data is displayed on the output device 254 and the process 500 ends.

Figure 5:
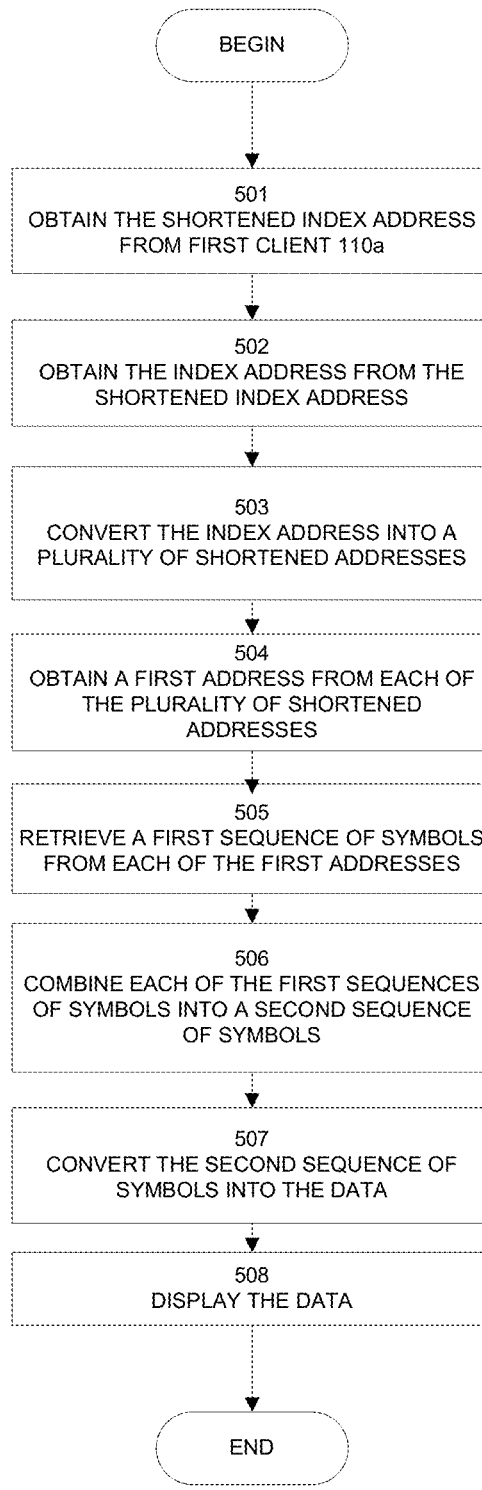
FIG. 5 illustrates an exemplary process for retrieving data from a shortened URL index address using an exemplary client of FIG. 2.

FIG. 5 sets forth an exemplary process 500 for retrieving data 224b from a shortened URL address using the exemplary second client 110b of FIG. 2. An example will now me described using the exemplary process 500 of FIG. 5, the image data 224a from FIG. 4A, the example of process 300 described above, and addresses that are URL addresses. The process 500 begins by proceeding to step 501, in which the user of the first client 110a provides the shortened index address 434 from step 308 of FIG. 3 and FIG. 4G to the user of the second client 110b. In step 502, after the user of the second client 110b enters the shortened index address 602 into the web browser 272, as illustrated in FIG. 6A, such as by clicking on a hyperlink, an index address 604 as illustrated in FIG. 6B is obtained from an HTTP redirect from the shortened index address 602. In step 503, and as illustrated in FIG. 6C, the index address 604 is converted into n shortened addresses (four of which are shown 606, 608, 610, and 612) using client-side scripting language instructions included in the "loadmany" web page portion of the index address 604 that, for example, takes portions of the index address 604 and associates one portion with each of the n shortened addresses 606, 608, 610, and 612. In step 504, a first address 614, 616, 618, and 620 is obtained from each of the n shortened addresses as illustrated in FIG. 6D using an HTTP redirect from the n shortened addresses.

In step 505, n first sequences of symbols 622, 624, 626, and 628 as illustrated in FIG. 6E are retrieved from the n first addresses 614, 616, 618, and 620. The first sequence of symbols 622, 624, 626, and 628 for each of the n first addresses 614, 616, 618, and 620 is obtained by retrieving the characters that appear after the last hash (e.g., "#") symbol in each of the each of the n first addresses 614, 616, 618, and 620. In step 506, each of the n first sequences of symbols is combined into a second sequence of symbols 630 as illustrated in FIG. 6F. In step 507, the second sequence of symbols is converted from character/text format into image data 224b of a binary format using a Base64 decoder included in the web browser 272. The image data 224b is displayed in the web browser 272 to the user on the output device 254 of the second client 110b in step 508, as illustrated in FIG. 6G, and the process 500 ends.

Figure 7:
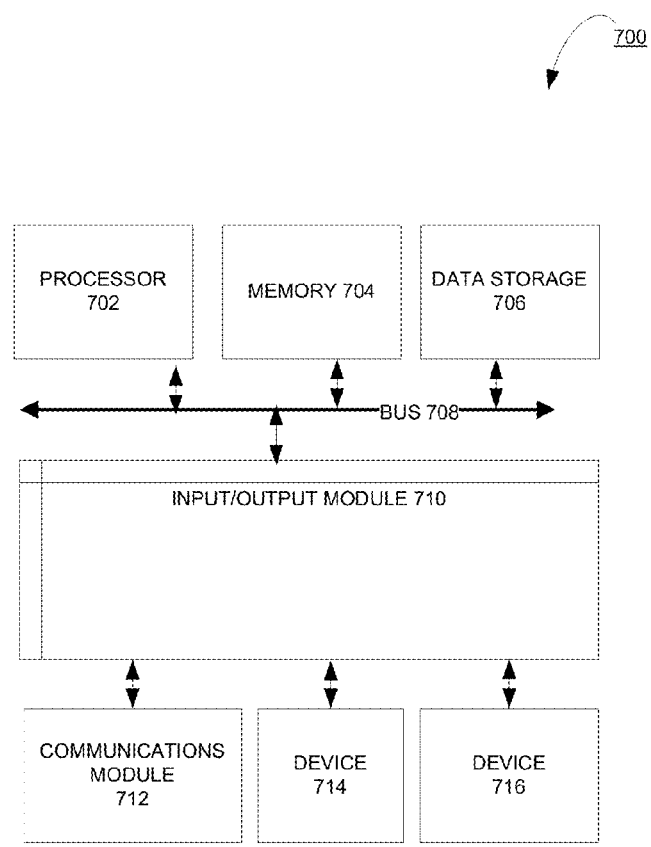
FIG. 7 is a block diagram illustrating an exemplary computer system with which the clients and server of FIG. 2 can be implemented.

FIG. 7 is a block diagram illustrating an exemplary computer system 700 with which the clients 110a and 110b and server 130 of FIG. 2 can be implemented. In certain aspects, the computer system 700 may be implemented using hardware or a combination of software and hardware, either in a dedicated server, or integrated into another entity, or distributed across multiple entities.

Computer system 700 (e.g., clients 110a and 110b and server 130) includes a bus 708 or other communication mechanism for communicating information, and a processor 702 (e.g., processors 212, 252, and 236) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 220, 270, and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, offside rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices (e.g., device 714 and 716). The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 (e.g., input device 216 and 256) and/or an output device 716 (e.g., output device 214 and 254). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as a CRT (cathode ray tube) or LCD (liquid crystal display) monitor, for displaying information to the user.

According to one aspect of the present disclosure, the clients 110a and 110b and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network.

Computing system 700 can include clients and servers. A client and server are generally remote from each other and typically interact through a communication network. The relationship of client and server arises by virtue of computer programs running on the respective computers and having a client-server relationship to each other. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for converting data into a shortened address have been described. A first user seeking to share data with a second user provides the data to the disclosed system, which encodes the data into one or many sequences of symbols and includes the sequence(s) of symbols into one or many addresses, which are shortened until a shortened index address of appropriate length is generated. The first user can then provide the shortened index address to the second user in order for the second user to obtain a copy of the data without the data having ever been stored on a server.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A system for converting data into a shortened Uniform Resource Locator (URL) address comprising:
    a memory for storing instructions to convert data;
    a processor configured to execute the instructions to:
        receive the data to be transmitted;
        convert the data into an encrypted string;
        divide the encrypted string into a plurality of encrypted substrings;
        include, in each of a plurality of first addresses, a respective one of the plurality of encrypted substrings;
        associate each of the plurality of first addresses with a corresponding shortened address;
        combine a portion of each of the shortened addresses into an index address; and
        associate the index address with a shortened index address.

2. The system of claim 1, wherein the encrypted string comprises a string of characters.

3. The system of claim 1, wherein the data is in a binary format.

4. The system of claim 1, wherein the data is converted into the encrypted string using at least one of hexadecimal, Base64, basE91, Ascii85, quoted-printable, uuencoding, yEnc, percent, BOO, BTOA, or USR encoding.

5. The system of claim 1, wherein the first addresses, the shortened addresses, the index address, and the shortened index address are URL addresses.

6. The system of claim 5, wherein the plurality of first addresses are associated with a corresponding shortened address using a URL shortener, and the index address is associated with a shortened index address using a URL shortener.

7. The system of claim 5, wherein the respective one of the plurality of encrypted substrings is included in each of the plurality of first addresses after a hash tag.

8. The system of claim 1, wherein the number of the plurality of encrypted substrings is based on dividing the number of symbols in the encrypted string by a predetermined numerical symbol limit.

9. The system of claim 1, wherein if the number of symbols in the combined portion of each of the shortened addresses is longer than a predetermined limit, the combined portion is associated with a corresponding shortened portion, wherein the shortened portion is combined into the indexed address instead of the combined portion.

10. The system of claim 9, wherein the combined portion is associated with a corresponding shortened portion using recursion.

11. The system of claim 1, wherein the data is obtained from a web browser, and the processor is further configured to execute instructions to provide the shortened index address to the web browser.

12. The system of claim 1, wherein the processor is further configured to execute instructions to:
    obtain the index address from the shortened index address;
    convert the index address into the shortened addresses;
    obtain each of the plurality of first addresses from the shortened addresses;
    retrieve the encrypted substrings from each of the plurality of first addresses;
    combine each of the encrypted substrings into the encrypted string; and
    convert the encrypted string into the data to be provided to a user.

13. The system of claim 12, wherein the encrypted substrings are converted into data using at least one of hexadecimal, Base64, basE91, Ascii85, quoted-printable, uudecoding, yDec, percent, BOO, BTOA, or USR decoder.

14. The system of claim 12, wherein the plurality of first addresses are obtained from the plurality of shortened addresses using a URL shortener, and the index address is obtained from the shortened index address using a URL shortener.

15. The system of claim 12, wherein each of the encrypted substrings is combined into the encrypted string using a client-side scripting language.

16. The system of claim 12, wherein the index address is obtained using a web browser, and the data is provided to the user in the web browser.

17. The system of claim 16, wherein the instructions to retrieve the encrypted substrings from each of the first addresses comprise instructions to load a frame in the web browser corresponding for each of the first addresses and retrieve the encrypted substrings from each corresponding frame.

18. The system of claim 16, wherein the encrypted substrings are converted by the web browser into data to be provided to the user.

19. A method for converting data into a shortened Uniform Resource Locator (URL) address comprising:
    receiving data to be transmitted;
    converting the data into an encrypted string;
    dividing the first sequence of symbols encrypted string into a plurality of encrypted substrings;
    including, in each of a plurality of first addresses, a respective one of the plurality of encrypted substrings;
    associating each of the plurality of first addresses with a corresponding shortened address;
    combining a portion of each of the shortened addresses into an index address; and
    associating the index address with a shortened index address.

20. The method of claim 19, wherein the encrypted string comprises a string of characters.

21. The method of claim 19, wherein the data is in a binary format.

22. The method of claim 19, wherein the data is converted into the encrypted string using at least one of hexadecimal, Base64, basE91, Ascii85, quoted-printable, uuencoding, yEnc, percent, BOO, BTOA, or USR encoding.

23. The method of claim 19, wherein the first addresses, the shortened addresses, the index address, and the shortened index address are URL addresses.

24. The method of claim 23, wherein the plurality of first addresses are associated with a corresponding shortened address using a URL shortener, and the index address is associated with a shortened index address using a URL shortener.

25. The method of claim 23, wherein the respective one of the plurality of encrypted substrings is included in each of the plurality of first addresses after a hash tag.

26. The method of claim 19, wherein the number of the plurality of encrypted substrings is based on dividing the number of symbols in the encrypted string by a predetermined numerical symbol limit.

27. The method of claim 19, wherein if the number of symbols in the combined portion of each of the shortened addresses is longer than a predetermined limit, the combined portion is associated with a corresponding shortened portion, wherein the shortened portion is combined into the indexed address instead of the combined portion.

28. The method of claim 27, wherein the combined portion is associated with a corresponding shortened portion using recursion.

29. The method of claim 19, wherein the data is obtained from a web browser, and the method further comprises providing the shortened index address to the web browser.

30. The method of claim 19, further comprising:
obtaining the index address from the shortened index address;
converting the index address into the shortened addresses;
obtaining each of the plurality of first addresses from the shortened addresses;
retrieving the encrypted substrings from each of the plurality of first addresses;
combining each of the encrypted substrings into the encrypted string; and
converting the encrypted string into the data to be provided to a user.

31. The method of claim 30, wherein the encrypted substrings are converted into data using at least one of hexadecimal, Base64, basE91, Ascii85, quoted-printable, uudecoding, yDec, percent, BOO, BTOA, or USR decoder.

32. The method of claim 30, wherein the first addresses are obtained from the plurality of shortened addresses using a URL shortener, and the index address is obtained from the shortened index address using a URL shortener.

33. The method of claim 30, wherein each of the encrypted substrings is combined into the encrypted string using a client-side scripting language.

34. The method of claim 30, wherein the index address is obtained using a web browser, and the data is provided to the user in the web browser.

35. The method of claim 34, wherein the retrieving the encrypted substrings from each of the plurality of first addresses comprises loading a frame in the web browser corresponding for each of the plurality of first addresses and retrieving the encrypted substrings from each corresponding frame.

36. The method of claim 34, wherein the encrypted string is converted by the web browser into data to be provided to the user.

37. A non-transitory machine-readable storage medium comprising machine-readable instructions for causing a processor to execute a method for converting data into a shortened Uniform Resource Locator (URL) address, comprising:
obtaining data to be transmitted;
converting the data into an encrypted string;
dividing the encrypted string into a plurality of encrypted substrings;
including, in each of a plurality of first addresses, a respective one of the plurality of encrypted substrings;
associating each of the plurality of first addresses with a corresponding shortened address;
combining a portion of each of the shortened addresses into an index address; and
associating the index address with a shortened index address.

38. The machine-readable storage medium of claim 37, wherein the method further comprises:
obtaining the index address from the shortened index address;
converting the index address into the shortened addresses;
obtaining each of the plurality of first addresses from the shortened addresses;
retrieving the encrypted substrings from each of the plurality of first addresses;
combining each of the encrypted substrings into the encrypted string; and
converting the encrypted string into the data to be provided to a user.

* * * * *